United States Patent [19]

Roberson et al.

[11] Patent Number: 5,799,880

[45] Date of Patent: Sep. 1, 1998

[54] METHOD AND APPARATUS FOR CONTINUOUS DEVULCANIZATION OF RUBBER

[75] Inventors: Paul R. Roberson, Massillon; Tim M. Boron, Canton, both of Ohio

[73] Assignee: Ultramer, Inc., Massillon, Ohio

[21] Appl. No.: 758,464

[22] Filed: Dec. 2, 1996

[51] Int. Cl.$^6$ .................................................. B02C 19/12
[52] U.S. Cl. .......................... 241/1; 241/260.1; 241/301; 241/DIG. 31; 264/444
[58] Field of Search .......................... 241/260.1, 1, 301, 241/DIG. 31; 264/442, 443, 444

[56] References Cited

U.S. PATENT DOCUMENTS

| | | | |
|---|---|---|---|
| 2,980,345 | 4/1961 | Keceioglu et al. | 241/1 |
| 3,811,623 | 5/1974 | Speer | 241/1 |
| 4,131,238 | 12/1978 | Tarpley | 241/1 |
| 4,168,295 | 9/1979 | Sawyer . | |
| 4,379,724 | 4/1983 | Kashiwagi . | |
| 4,556,467 | 12/1985 | Kuhn et al. | 241/1 |
| 5,202,066 | 4/1993 | Furusawa et al. | 241/1 |
| 5,258,413 | 11/1993 | Isayev . | |
| 5,284,625 | 2/1994 | Isayev et al. . | |
| 5,316,225 | 5/1994 | Geyer | 241/DIG. 31 |
| 5,538,191 | 7/1996 | Holl | 241/1 |

FOREIGN PATENT DOCUMENTS

| | | | |
|---|---|---|---|
| 3060748 | 3/1991 | Japan | 241/DIG. 31 |
| 95/24999 | 9/1995 | WIPO . | |

Primary Examiner—Mark Rosenbaum
Attorney, Agent, or Firm—Rankin, Hill, Porter & Clark LLP

[57] ABSTRACT

An apparatus for devulcanizing vulcanized rubber or crosslinked polymeric material has an ultrasonic exposure portion including a body forming an exposure channel through which particles of the material flow and an ultrasonic generator including a horn extending generally transverse to the direction of the material flow. The apparatus also has a preconditioning portion for feeding the particles to the ultrasonic exposure channel. The method for devulcanizing vulcanized rubber or crosslinked polymeric material comprises the steps of preconditioning and feeding particles of the material, including heating the particles; feeding the particles through a pressurized exposure channel; and exposing the particles to ultrasonic energy within the exposure channel with an ultrasonic wave propagated in a direction transverse to the direction of the channel to effect devulcanization by breaking chemical bonds in the material.

12 Claims, 5 Drawing Sheets

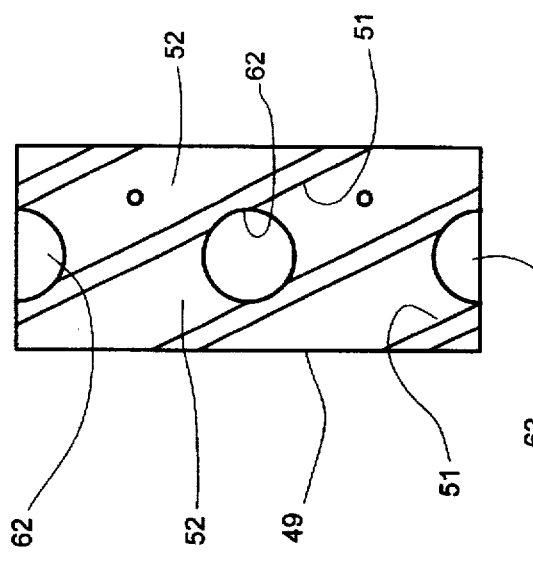
FIG. 7
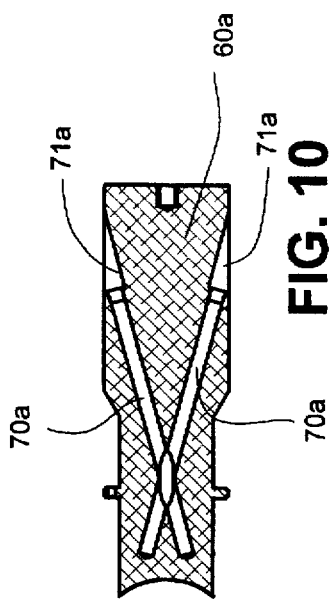
FIG. 8
FIG. 10
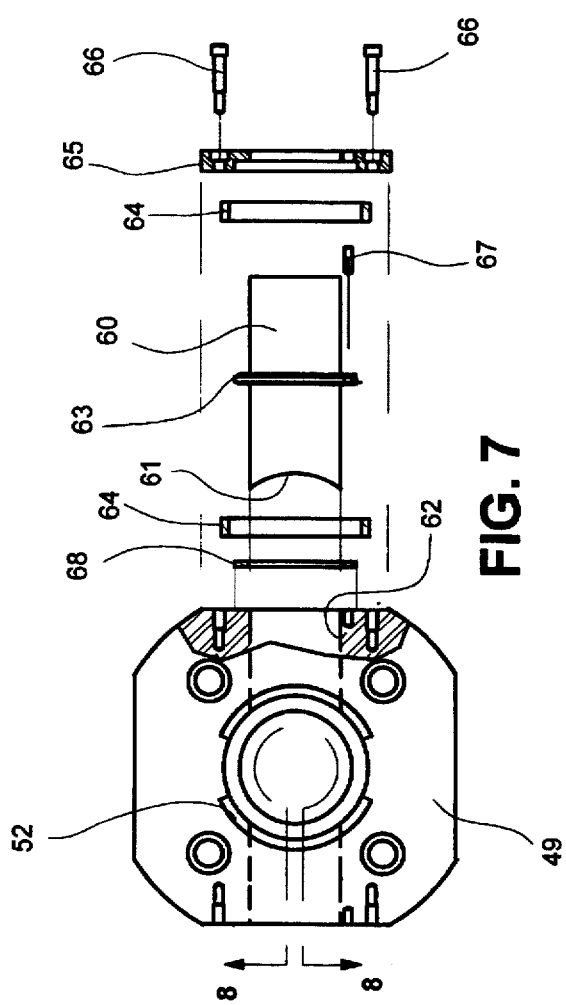
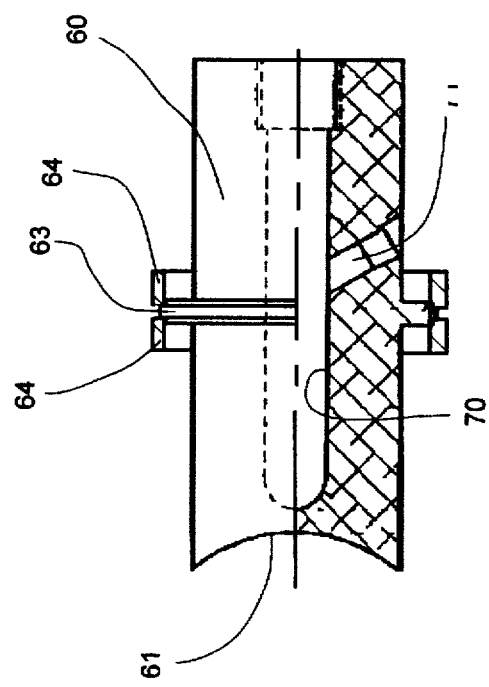
FIG. 9

METHOD AND APPARATUS FOR CONTINUOUS DEVULCANIZATION OF RUBBER

BACKGROUND OF THE INVENTION

1. Field of the Invention

This invention relates to the recycling of rubber and other crosslinked polymeric materials, and in particular, to a continuous process for devulcanizing such materials so that the materials can be reused.

2. Description of the Prior Art

The disposal of used tires has become an increasing environmental concern. Waste piles and land fills filled with discarded tires have become common sights. Until recently, there has not been a satisfactory way of dealing with the disposal or reuse of tires and other products made of natural or synthetic rubber reinforced with other materials. While some tires have been used as retaining walls or traffic barrel anchors or have been used in other ways, the demand for such use is very limited, and it does not provide an adequate means for absorbing all of the tires which are discarded.

Various treatments have been explored in an attempt to recover the rubber from the tires in a form in which it can be reused, but these attempts have generally been unsuccessful or limited. One process, however, which has developed some interest is an ultrasonic devulcanization process in which the cured rubber from tires and other products, such as hoses and belts, is ground into particles and exposed to ultrasonic energy in a controlled process. When properly exposed to the ultrasonic energy, the carbon-sulfur and sulfur—sulfur bonds of the vulcanized rubber break, creating a material which is substantially devulcanized and can then be reused in the manufacture of rubber products.

Apparatus and methods for devulcanizing rubber using ultrasonic energy are described in detail in U.S. Pat. Nos. 5,258,413 and 5,284,625, issued to Isayev et al. While these apparatus and methods are generally effective, they do not provide for a method by which large quantities of material can be processed continuously in a cost effective manner. One of the problems encountered in designing a continuous ultrasonic devulcanization process is providing continuous exposure of the material to the ultrasonic energy in an efficient manner such that the material is suitably devulcanized. In the aforementioned Pat. No. 5,258,413 and 5,284,625, this was accomplished by positioning the ultrasonic horn in a coaxial direction within the flow of the material at the extruder exit. This required that all of the material flow past the ultrasonic horn since the horn essentially blocked the exit through which the material flowed. While this design was generally effective in devulcanizing the rubber, it limited the amount of material which could be processed, since the position of the horn severely restricted the flow of the material as it came from the extruder exit.

SUMMARY OF THE INVENTION

The present invention overcomes the problems in the prior art method and apparatus and provides other advantages not realized heretofore. In accordance with the present invention, a continuous ultrasonic devulcanization process is provided in which the ultrasonic horn is arranged in a direction transverse or radial to the axial direction of flow. In this manner, the horn does not impede or restrict the flow of material, and material can be continuously processed in an efficient and cost effective operation.

Using the design of the present invention, the material is preferably conveyed through a plurality of helical channels formed by helical grooves within an exposure body with a cylindrical core rotating within the body. The channels define a flowpath for the material where it is continuously exposed to ultrasonic energy provided by means of a generator which includes a horn inserted into the channel. Ultrasonic energy is thus transmitted into the material in a direction generally transverse to the flow direction, so that the material can be efficiently processed.

The present invention also includes a preconditioning portion upstream of the ultrasonic treatment portion and a postconditioning portion downstream of the treatment portion. The preconditioning portion, which preferably includes a feedscrew rotating within a heated barrel, heats and pressurizes the material before it enters the treatment portion. The postconditioning portion, which includes a feedscrew within an enclosed cooled barrel, allows the treated material to cool without exposing the material to the air or allowing the escape of gasses or by-products.

The method and apparatus of the present invention provides an elongated axial design in which the material continues to flow along the axis during and after ultrasonic treatment. This axial design allows the method and apparatus to be combined with other processes so that the treated material can be further processed after it exits from the apparatus. For example, an extrusion process or other axial fed process can be performed with the treated material at the exit of the apparatus of this invention. The method and apparatus of this invention thus allows for further processing after the ultrasonic treatment of the material.

These and other advantages are provided by the present invention of an apparatus for devulcanizing vulcanized rubber or crosslinked polymeric materials, comprising an ultrasonic exposure portion including a body forming an exposure channel through which particles of the material flow and an ultrasonic generator including a horn extending generally transverse to the direction of the channel; and further comprising a preconditioning portion for feeding the particles to the ultrasonic exposure channel.

The present invention also contemplates a method for devulcanizing vulcanized rubber or crosslinked polymeric material, comprising the steps of preconditioning and feeding particles of the material, including heating the particles; feeding the particles through a pressurized exposure channel; and exposing the particles to ultrasonic energy within the exposure channel with an ultrasonic wave propagated in a direction transverse to the direction of the channel to effect devulcanization by breaking chemical bonds in the material.

BRIEF DESCRIPTION OF THE DRAWINGS

FIG. 7 is an end elevational view of the ultrasonic exposure portion of FIG. 5 disassembled.

FIG. 8 is a planar view of the interior of the body of the ultrasonic exposure portion taken along line 8—8 of FIG. 7.

FIG. 9 is a side elevational view, partially sectioned, of the ultrasonic horn of FIG. 7.

FIG. 10 is a side sectional view, similar to FIG. 9, of an alternative ultrasonic horn.

DETAILED DESCRIPTION OF THE PREFERRED EMBODIMENT

Figure 1:
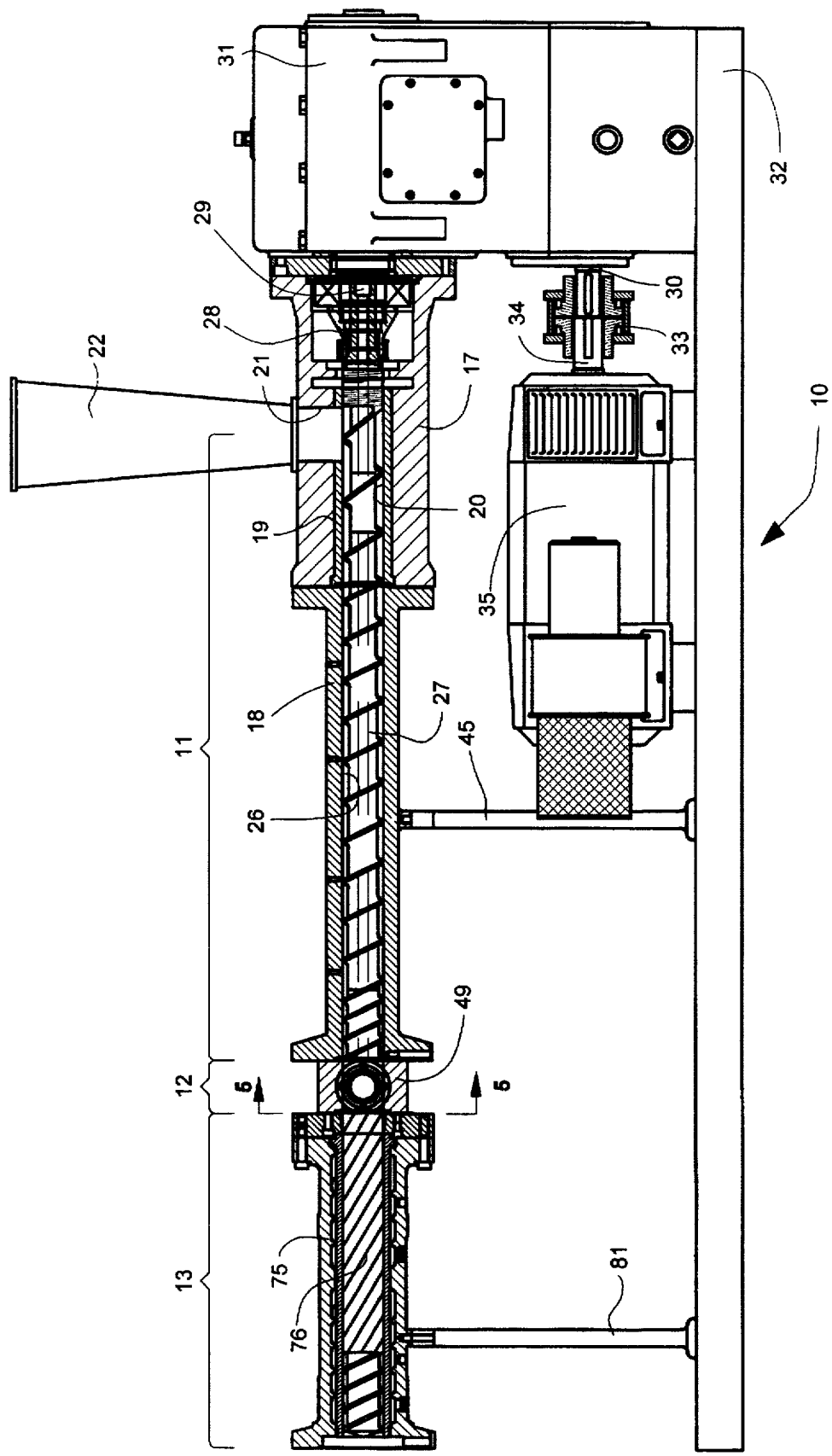
FIG. 1 is a side sectional view of the apparatus of the present invention for performing the method of the present invention.

Referring more particularly to the drawings and initially to FIG. 1, there is shown the apparatus of the present invention which comprises a devulcanizing extruder assembly 10 having three portions: a preconditioning portion 11, an ultrasonic exposure portion 12, and a postconditioning portion 13.

The preconditioning portion 11 comprises a main body 17 to which an elongated cylindrical barrel 18 is attached at one end. The main body 17 has a central bore therein lined with a cylindrical liner 19, forming a feed chamber 20 within the liner. A radially extending opening 21 is formed in the upper portion of the main body 17 through which material can be fed into the chamber 20. A hopper 22 is positioned above the opening to funnel a metered supply of material to be treated.

The barrel 18 also has a central bore forming a feed chamber 26. The barrel 18 is attached to the downstream end of the main body 17 using suitable means (not shown) with the barrel and the liner 19 concentric to each other, so that the chambers 20 and 26 form a continuous feed chamber in which a feedscrew 27 is positioned. The feedscrew 27 is connected at one end through a coupling 28 to a drive shaft 29. The drive shaft 29 is, in turn, connected to input shaft 30 through a drive train (not shown) contained within an enclosure 31 mounted on a base 32. The input shaft 30 is connected through a coupling 33 to the shaft 34 of a suitable electric motor 35.

Figure 2:
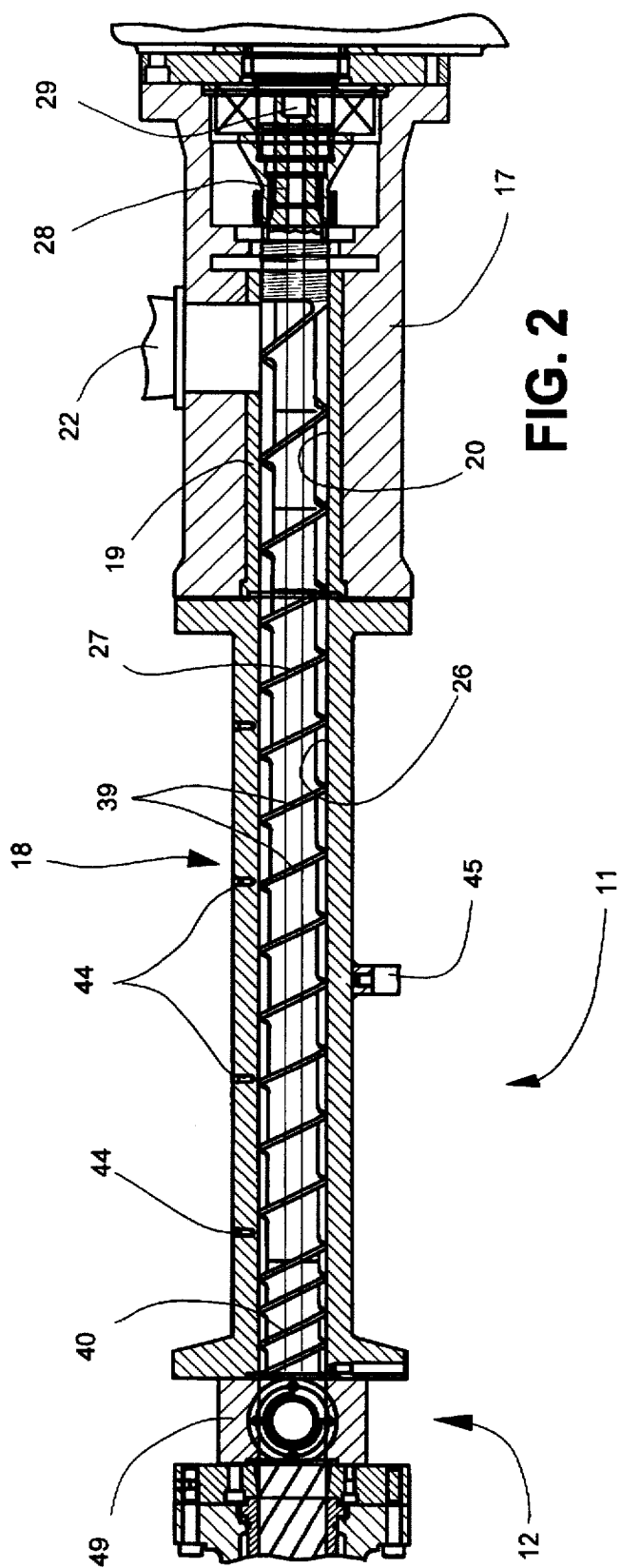
FIG. 2 is a side sectional view of the preconditioning portion and the ultrasonic exposure portion of the apparatus of FIG. 1 to a larger scale.

Most of the elements of the preconditioning portion 11 of the apparatus of this invention can be suitably adapted from known elements used in material feeding and extrusion, so they need not be discussed here in further detail. The feedscrew 27 is typical of screws used in feeding material in extrusion processes, and it is typically tapered in the upstream direction, so that it increases in root diameter as the material flows downstream, thereby increasing the pressure of the material as the material is conveyed through the barrel 18. The feedscrew 27 contains a typical spiral flight 39 (FIG. 2) along its length to assist in conveying the material. A single flight 39 is shown along most of the length of the feedscrew 27 although more than one flight can be used. At the downstream end of the feedscrew 27, a double flight 40 is provided to uniformly distribute the pressure on the material fed into the exposure portion 12.

A plurality of heaters (not shown) is mounted around the barrel 18 spaced along its length to conduct heat through the barrel into the material being fed through the barrel, heating the material to an elevated temperature, preferably around 300° F., before it reaches the ultrasonic exposure portion 12, so that the ultrasonic devulcanization process can be effective. Suitable temperature sensors such as thermocouples 44 are also provided in the barrel to measure the heat provided by the heaters so that the temperature can be controlled. In addition, suitable pressure transducers (not shown) may be located within the feed chambers 20 and 26, preferably at the downstream end, to measure the pressure of the material in the chamber, in order to maintain proper pressure prior to introduction of the material into the ultrasonic exposure portion 12, so that the ultrasonic devulcanization process is effectively performed. The length of the barrel 18 is supported by a suitable support 45.

Figure 6:
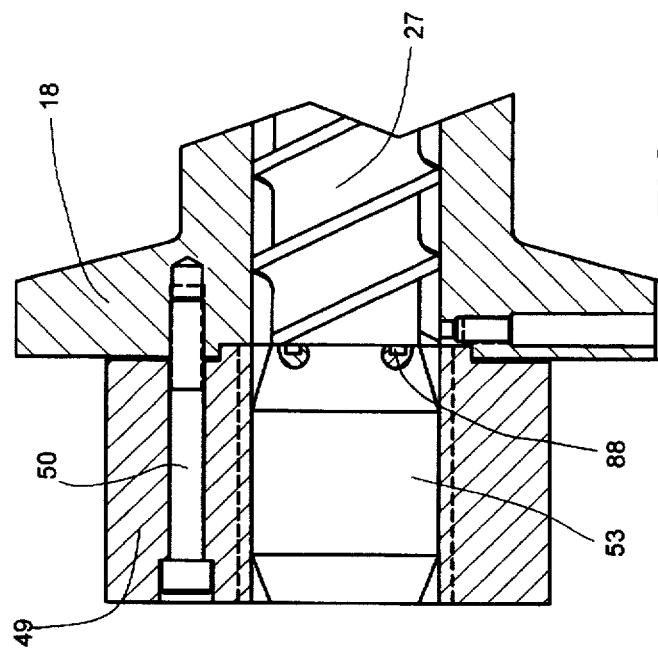
FIG. 6 is a side sectional view of the ultrasonic exposure portion taken along line 6—6 of FIG. 5.

The ultrasonic exposure portion 12 comprises a casting or body 49 attached to the exit end of the barrel 18 by screws 50 (FIG. 6). The body 49 is preferably a hollow casting having a central cylindrical opening which is generally coaxial with the feed chamber 26 of the barrel 18. The central opening in the body 49 is provided with a plurality of flights 51 and channels 52 (FIGS. 7 and 8) which extend in a spiral formation in the interior surface of the cylindrical opening. A cylindrical core 53 (FIG. 6) rotates within the central opening. Unlike the flighted feedscrew 27, the core 53 has a smooth outer surface. The flights 51 and the helical channels 52 in the interior surface of the central body 49 opening, along with the outer surface of the core 53, provide the flowpath for the material through the ultrasonic exposure portion 12. The core 53 is attached to the feedscrew 27 by a threaded joint (not shown), so that the core rotates with the feedscrew. As the core 53 rotates within the central opening in the body 49, the rotation of the core 53, coupled with the stationary flights 51, causes the material to flow through the spiral channels 52. This flow is also enhanced by the pressure of the material introduced into the body 49 by the action of the feedscrew 27.

Figure 5:
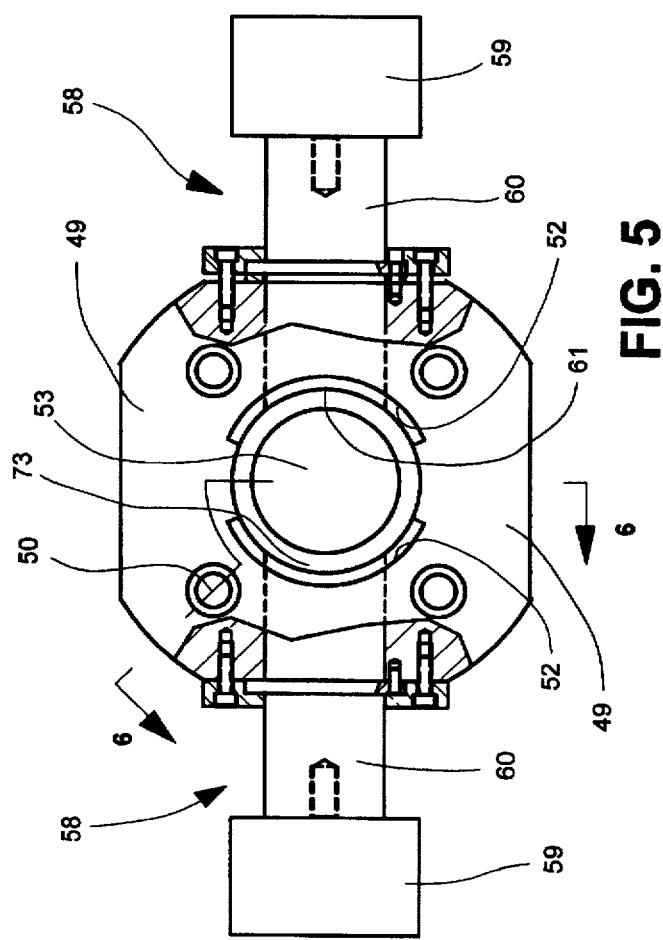
FIG. 5 is an end sectional view of the ultrasonic exposure portion taken along line 5—5 of FIG. 3.

Attached to the body 49 and extending therefrom in a direction transverse or radial to the axis of the flow are one or more ultrasonic generator assemblies 58 (FIG. 5). Each of the ultrasonic generator assemblies 58 comprises a transducer 59 connected to a waveguide or horn 60. The transducer 59 preferably includes a piezoelectric or magnetostrictive element vibrating in the ultrasonic frequency range, preferably at about 18 to 22 kHz. The forward end 61 of each of the horns 60 extends into a corresponding bore 62 extending through the body 49 in a radial direction relative to the general axis of flow. There is preferably a very close tolerance between the bore 62 and the horn 60 to effectively close the bore. Each of the assemblies 58 is supported by the connection of a mounting flange 63 to the body 49 using a mounting isolation ring 64 and a clamping collar 65 which is attached to the body 49 by screws 66 (FIGS. 5 and 7). A dowel pin 67 extends through an opening in the flange 63 and into a corresponding opening in the body 49 to position the horn with respect to the body. A gasket or spacer 68 is positioned between the isolation ring 64 and the body surface. The horn 60 is of a one-piece construction to oscillate properly and is made of an acoustically suitable material, such as aluminum, magnesium or titanium alloys, having properties to transmit ultrasonic energy to the material being treated. The length of the horn 60 depends, of course, upon the desired ultrasonic frequency being produced and the material of construction. The flange on the horn 60 extends radially outwardly from outer circumference of the horn at one of the nodal points of the vibrating horn to allow the horn to be securely mounted while allowing the horn to vibrate at the desired ultrasonic frequency in accordance with known ultrasonic techniques. As shown particularly in FIG. 7, the forward end 61 of the horn 60 is curved to match the interior surface of the channel 52 and the core 53.

Due to the heat of the material before it reaches the exposure portion 12 and the heat generated during the ultrasonic devulcanization process, the horn 60 is internal cooled. For example, as shown in FIG. 9, the horn 60 may be provided with an internal cooling passage 70 which allows a cooling fluid, such as water, to be circulated through the horn. The passage 70 connects to an opening 71 along the side of the horn 60, and a suitable supply and drain hose (not shown) may be connected at the opening 71. Alternatively, as shown in FIG. 10, a horn 60a may be provided with cooling passages 70a each of which is formed by drilling passageway at an angle to the axis of the horn. Access to the two passages 70a is provided at openings 71a where the passages may be connected to suitable supply and drain hoses.

The cooling of the horn 60 using the passages 70 or 70a not only prevents the horn from overheating, it also provides a means for controlling the tolerance between the horn and the bore 62 in which the horn is mounted in the body 49. Since the horn 60 is subject to thermal expansion, the effective outer diameter of the horn can be controlled within close tolerance by cooling the horn more or less. In this manner, the tolerance between the horn 60 and the bore 62 can be controlled to very close tolerances.

The number of ultrasonic generator assemblies 58 matches the number of exposure channels 52 provided in the body, so that the material in each of the channels is exposed to the ultrasonic energy as it passes through the channel. As shown in the preferred embodiment, there are two ultrasonic generator assemblies 58 and two spiral channels 52 formed by the grooves in the interior surface of the central opening in the body 49. Other numbers of ultrasonic generator assemblies and channels are possible; for example, four ultrasonic generator assemblies could be provided spaced 90° apart around the circumference of the body 49, with four corresponding channels.

The configuration of the channels and the curved end of the horn associated with the channel is important to effect the devulcanization operation. Preferably, the end 61 of the horn, as shown in FIG. 9, is larger than the width of the groove forming the channel 52 (FIG. 8), so that all of the material passing through the channel is exposed to the ultrasonic energy for a given length of time. In addition, the assembled clearance 73 (FIG. 5) between the horn face 61 and the core 53 for each of the assemblies 58 should be minimized so that a relatively narrow layer of material is exposed to the ultrasonic energy. The clearance 73 can be varied and is determined and established using spacers 68 of various thicknesses. For an aluminum alloy ultrasonic horn adapted to transmit ultrasonic energy at a frequency of 20 kHz, the horn is 5 inches in length and 2.25 inches in diameter, and the grooves forming the channels 52 should be no greater than 2 inches wide and ¼ inches deep. The clearance 73 between the horn face 61 and the core 53 can be adjusted by moving the horn radially in and out of the bore 62 in which the horn is mounted in the body 49. To increase the clearance 73, an additional shim or spacer 68 or a spacer having a different thickness can be mounted in front of the isolation ring 64 around the flange 63 where the horn 60 is mounted to the body 49. To decrease the clearance 73 the shim or spacer 68 can be reduced or removed.

The presence of the core 53 is important in the process of the present invention since it provides a reflective backing for the ultrasonic waves generated by the horn 60. As ultrasonic energy is produced by the horn 60, it is transmitted into the material occupying the clearance 73 and then hits the outside of the core 53. The core 53 thus provides a backing which absorbs the energy or reflects the energy back into the material, and otherwise prevents the material from simply moving away from the horn in response to the ultrasonic waves. The action between the horn 60 and the core 53 is somewhat similar to a hammer and anvil, with the horn being the hammer and the core being the anvil. Together these elements increase the effectiveness of the ultrasonic treatment of the material.

Since the horn 60 is cylindrical, the end 61 of the horn adjacent to the channel 52 is circular in cross section. This means, as shown in FIG. 8, that material traveling through the middle of the channel 52 is exposed to the ultrasonic energy for a longer duration than material traveling along the edges of the channel. This effect can be corrected by providing a horn which is square or rectangular in cross section, or by contouring the face 61 of the horn so that less material flows along the edges. The forward end 61 of the horn is also preferably provided with a rounded edge on its upstream side to minimize disruptions in the flow of material as it encounters the horn, thereby lowering pressure and pretreating the material.

The exposure channels 52 are preferably helical, although straight channels could also be used. The helical channels 52, however, result in a downstream flow component imparted upon the material by the rotating core 53 to help convey the material through the channel. In addition, the helical design of each of the channels 52 creates a shear which causes additional mixing or tumbling of the material particles to occur as the material flows through the channel. This mixing of the material as it travels through the channel makes the material mixture more homogeneous and assists in exposing more of the material particles to the ultrasonic energy in the clearance 73. It also prevents some of the material particles from being overtreated by prolonged exposure to the ultrasonic energy.

After the treated material leaves the ultrasonic exposure portion 12, it enters the postconditioning portion 13 where it is cooled without exposure to air. While the material is at approximately 300° F. when it enters the ultrasonic exposure portion 12, the ultrasonic energy imparted to the material along with the chemical reactions which result in the breaking of the carbon-sulfur and sulfur—sulfur bonds increases the temperature of the material significantly, so that the material may be, for example, around 500° F. when it exits the exposure portion 12. If the material is simply collected when it exits the exposure portion 12, the high temperature of the material along with the exposure of the material to the air could result in significant oxidation or degradation of the material, creating undesirable by-products. In addition, the hot material could cause the release of noxious gases. Therefore, instead of simply collecting the material after it leaves the exposure portion 12, the present invention provides for the postconditioning portion 13 where the material is cooled in an enclosed passageway which prevents exposure to the air. In addition, the material is thoroughly mixed to provide a homogeneous mixture of material.

Figure 3:
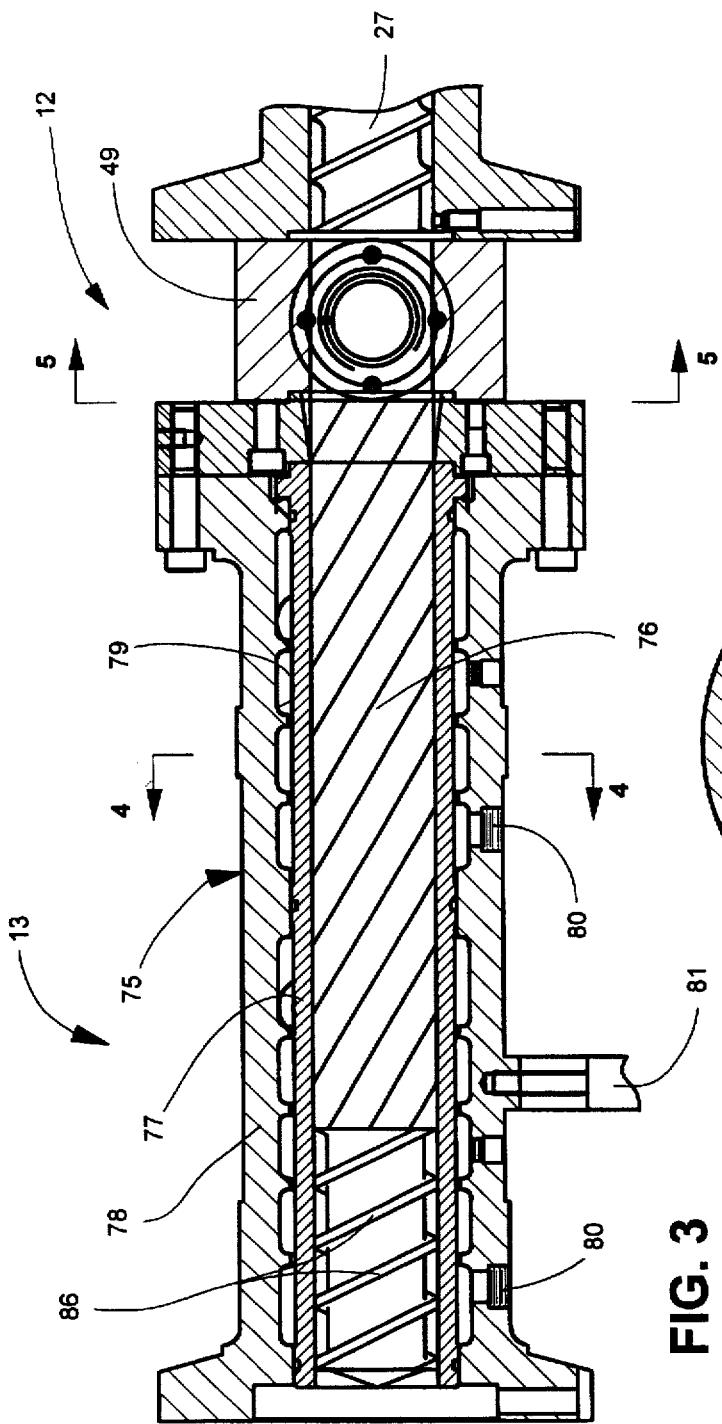
FIG. 3 is a side sectional view of postconditioning portion and the ultrasonic exposure portion of the apparatus of FIG. 1 to a larger scale.

As shown in FIG. 3, the postconditioning portion 13, which is connected to the downstream end of the exposure portion 12, comprises a cylindrical barrel assembly 75 attached to the body 49 of the exposure portion. Within the barrel 75 is a feedscrew extension 76 which is connected to the core 53 and rotates therewith. Preferably, the core 53 is integrally formed on the upstream end of the feedscrew extension 76. Since the core 53 is attached to the feedscrew 27, the feedscrew 27, the core 53 and the feedscrew extension 76 are all connected together, and they are together rotated by the drive motor 35 thorough its connection to the feedscrew 27. The barrel assembly 75 is formed of an inner sleeve 77 and an outer jacket 78 with a plurality of cooling passages 79 formed therebetween. A cooling liquid, such a water, is circulated through the passages 79 to cool the barrel assembly 75, and thus cool the material as it flows through the postconditioning portion 13. Hose fittings 80 are provided on the jacket 78 by which the barrel assembly can be connected to a supply of a cooling liquid. The barrel assembly may be provided with suitable temperature and pressure transducers (not shown) so that the temperature and pressure of the material after it exits the exposure portion 12 may be monitored and controlled. The barrel assembly 75 is supported by a support member 81.

Figure 4:
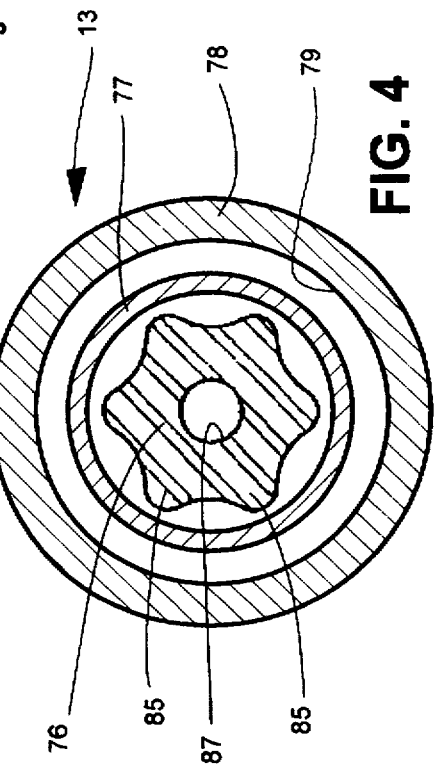
FIG. 4 is an end sectional view of the postconditioning portion taken along line 4—4 of FIG. 3.

As shown in FIG. 4, the feedscrew extension 76 is different in configuration from the feedscrew 27. The upstream end of the feedscrew extension 76 comprises rounded helical lobes 85 instead of flights. The lobes 85 help to mix the devulcanized material as it flows through the postconditioning portion 13 so that the material is better cooled by the inner sleeve 77 of the barrel assembly and so that a homogeneous mixture of treated material is obtained. The downstream end of the feedscrew extension 76 has flights 86 (FIG. 3) which assist in moving the treated material out of the barrel assembly 75. The feedscrew extension 76 also has an interior passage 87 (FIG. 4) for circulation of a cooling liquid. A sealing device, such as an O-ring 88 (FIG. 6) seals the interior fluid passage 87 of the feedscrew extension 86, the core 53 and the feedscrew 27.

The treated material discharges from the exit end of the postconditioning portion 13. A suitable collection container may be placed at the exit to collect the material as it exits. The feedscrew extension flights 86 have the ability to pressurize the treated material, thereby allowing flow of the material through a die (not shown) which can be mounted at the exit end. The die would form the treated material into discrete geometry useful for subsequent packaging or processing.

In operation, a supply of untreated material is metered into the hopper 22. If desired, a supply system, such as a conveyor, may be connected to the hopper 22 to provide a continuous metered supply of untreated material. The material is preferably untreated ground vulcanized rubber particles that have been classified by particle size and distribution. Such material can be recovered from used tires, but should also be substantially free of fabric and metal. The material is fed from the hopper 22 into the feed chamber 20 of the main body 17, where it is conveyed by the action of the rotating feedscrew into the preconditioning portion 11 of the apparatus. The feedscrew 27 rotates by means of its connection to the drive motor 35 through the drive train located within the enclosure 31. Preferably, the feedscrew rotates at a speed of about 40 rpm.

As the material flows downstream, it is heated by the heaters around the barrel 18 and the pressure of the material increases as the body of the feedscrew 27 increases in diameter. When the material reaches the exit end of the preconditioning portion 11, the material is preferably heated to a temperature of 300° F. and is at a pressure of 1,000 psi.

The material is fed from the feed chamber 26 of the preconditioning portion 11 into one of the exposure channels 52 formed on the interior surface of the central opening in the exposure portion body 49. Since the channels 52 are helical, the material continues to be mixed or churned as it flows through the channel. At the location of the horn 60, the material is exposed to ultrasonic energy, preferably in the range of 18–22 kHz. The ultrasonic energy is provided by the transducer 59 of one of the ultrasonic generator assemblies 58 which vibrates the horn 60. The ultrasonic energy acts to break the chemical bonds, specifically the carbon-sulfur and sulfur—sulfur bonds, in the rubber material, effectively devulcanizing it. After devulcanization, the material continues to flow through the channel 52 and into the postconditioning portion 13, where it is mixed and cooled by the action of the feedscrew extension 76 and the cooled barrel assembly 75. At the exit end of the barrel assembly, the devulcanzied material discharges from the apparatus.

While the ultrasonic generator assemblies 58 preferably extend radially to the axis of flow as shown in the preferred embodiment, it is not necessary that they be precisely on the radius. There could be a small angle between the radius of the exposure portion body 49 and the axis of the horn 60 of the assembly 58. It is only important that the ultrasonic generator assemblies 58 be generally transverse to the direction of flow of the material so that the horn does not impede the flow of material.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. An apparatus for devulcanizing vulcanized rubber or crosslinked polymeric material, comprising:
   an ultrasonic exposure portion including
      a body forming a plurality of exposure channels through which particles of the material flow, and
      a plurality of ultrasonic generators each associated with one of the channels and each including a horn extending generally transverse to the direction of the channel;
   a preconditioning portion for feeding the particles to the ultrasonic exposure channel.

2. An apparatus for devulcanizing vulcanized rubber or crosslinked polymeric material as recited in claim 1, wherein the channels extend helically through the body.

3. An apparatus for devulcanizing vulcanized rubber or crosslinked polymeric material as recited in claim 1, comprising in addition a postconditioning portion connected to the ultrasonic exposure portion for receiving material from the ultrasonic exposure portion.

4. An apparatus for devulcanizing vulcanized rubber or crosslinked polymeric material, comprising:
   an ultrasonic exposure portion including
      a body having a opening therethrough, a plurality of grooves being formed on the inside of the opening
      a cylindrical core adapted for rotation within the opening, the outside of the core and the grooves forming a plurality of helically-extending exposure channels through which particles of the material flow, and
      a plurality of ultrasonic generators each associated with one of the channels and each including a horn extending generally transverse to the direction of the associated channel;
   a preconditioning portion connected to the ultrasonic exposure portion for feeding the particles to the ultrasonic exposure portion.

5. An apparatus for devulcanizing vulcanized rubber or crosslinked polymeric material as recited in claim 4, wherein the preconditioning portion includes a barrel with a feedscrew rotating within the barrel to feed the particles to the ultrasonic exposure portion.

6. An apparatus for devulcanizing vulcanized rubber or crosslinked polymeric material as recited in claim 5, wherein the core is attached to the feedscrew to rotate therewith.

7. An apparatus for devulcanizing vulcanized rubber or crosslinked polymeric material as recited in claim 4, comprising in addition a postconditioning portion connected to the ultrasonic exposure portion for receiving material from the ultrasonic exposure portion.

8. An apparatus for devulcanizing vulcanized rubber or crosslinked polymeric material as recited in claim 7, wherein the postconditioning portion includes a barrel and a feedscrew extension adapted to rotate within the barrel to convey material from the ultrasonic exposure portion.

9. An apparatus for devulcanizing vulcanized rubber or crosslinked polymeric material as recited in claim 8, wherein the core is attached to the feedscrew to rotate therewith.

10. An apparatus for devulcanizing vulcanized rubber or crosslinked polymeric material, comprising:
   an ultrasonic exposure portion including
      a body having a opening therethrough, a plurality of grooves being formed on the inside of the opening
      a cylindrical core adapted for rotation within the opening, the outside of the core and the grooves forming a plurality of helically-extending exposure channels through which particles of the material flow, and
      a plurality of ultrasonic generators each associated with one of the channels and each including a horn extending generally transverse to the direction of the associated channel;
   a preconditioning portion connected to the ultrasonic exposure portion for feeding the particles to the ultrasonic exposure portion, the preconditioning portion including
      a first barrel having heaters for heating the particles as they travel through the first barrel, and
      a feedscrew adapted to rotate within the barrel to feed the particles to the ultrasonic exposure portion, the feedscrew connected to the core to rotate therewith; and
   a postconditioning portion connected to the ultrasonic exposure portion for receiving material from the ultrasonic exposure portion, the postconditioning portion including
      a second barrel having cooling channels for circulation of a cooling fluid to cool the material as it travels through the second barrel, and
      a feedscrew extension adapted to rotate within the barrel to convey material from the ultrasonic exposure portion, the feedscrew extension connected to the core to rotate therewith.

11. A method for devulcanizing vulcanized rubber or crosslinked polymeric material, comprising the steps of:
   preconditioning and feeding particles of the material, including heating the particles;
   feeding the particles through a plurality of pressurized exposure channels; and
   exposing the particles to ultrasonic energy within the exposure channels with an ultrasonic wave propagated by one of a plurality of ultrasonic generators each associated with one of the channels in a direction transverse to the direction of the channel to effect devulcanization by breaking chemical bonds in the material.

12. A method for devulcanizing vulcanized rubber or crosslinked polymeric material as recited in claim 11, wherein the particles are fed through a plurality of helically extending exposure channels.

* * * * *